United States Patent
Karve et al.

(10) Patent No.: US 11,636,045 B2
(45) Date of Patent: *Apr. 25, 2023

(54) TRANSLATING VIRTUAL ADDRESSES IN A VIRTUAL MEMORY BASED SYSTEM

(71) Applicant: International Business Machines Corporation, Armonk, NY (US)

(72) Inventors: Mohit Karve, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,667

(22) Filed: Aug. 30, 2022

(65) Prior Publication Data

US 2022/0414018 A1   Dec. 29, 2022

Related U.S. Application Data

(63) Continuation of application No. 16/701,307, filed on Dec. 3, 2019, now Pat. No. 11,461,237.

(51) Int. Cl.
*G06F 12/1009* (2016.01)

(52) U.S. Cl.
CPC .... *G06F 12/1009* (2013.01); *G06F 2212/152* (2013.01)

(58) Field of Classification Search
CPC .......... G06F 12/1009; G06F 2212/152; G06F 2212/30; G06F 2212/301; G06F 2212/302; G06F 2212/304; G06F 2212/65; G06F 2212/651
USPC ....................................... 711/206
See application file for complete search history.

(56) References Cited

U.S. PATENT DOCUMENTS

| | | | |
|---|---|---|---|
| 4,792,897 A | 12/1988 | Gotou et al. | |
| 9,058,284 B1 | 6/2015 | Ben-Meir et al. | |
| 9,811,472 B2 | 11/2017 | Bybell et al. | |
| 10,402,340 B2 | 9/2019 | Lea | |
| 10,621,106 B1 | 4/2020 | Campbell et al. | |
| 2005/0251657 A1 | 11/2005 | Boucher | |

(Continued)

OTHER PUBLICATIONS

List of IBM Patents or Patent Applications Treated as Related, dated Dec. 7, 2022, 2 pages.

(Continued)

*Primary Examiner* — Reginald G Bragdon
*Assistant Examiner* — Aaron D Ho
(74) *Attorney, Agent, or Firm* — Scully, Scott, Murphy & Presser, P.C.

(57) ABSTRACT

Translating virtual addresses to second addresses by a memory controller local to one or more memory devices, wherein the memory controller is not local to a processor, a buffer for storing a plurality of Page Table Entries, or a Page Walk Cache for storing a plurality of page directory entries, the method including by the memory controller: receiving a page directory base and a plurality of memory offsets from the processor; reading a first level page directory entry using the page directory base and a first level memory offset; combining the second level offset and the first level page directory entry; reading a second level page directory entry using the first level page directory entry and the second level memory offset; sending to the processor the first level page directory entry or the second level page directory entry; and sending a page table entry to the processor.

20 Claims, 7 Drawing Sheets

(56) References Cited

U.S. PATENT DOCUMENTS

| | | |
|---|---|---|
| 2007/0288721 A1 | 12/2007 | Kruger et al. |
| 2010/0045687 A1 | 2/2010 | Gupte et al. |
| 2013/0339652 A1 | 12/2013 | Bybell et al. |
| 2013/0339654 A1 | 12/2013 | Bybell et al. |
| 2014/0040529 A1 | 2/2014 | Grisenthwaite |
| 2014/0089572 A1 | 3/2014 | Koka et al. |
| 2015/0095610 A1 | 4/2015 | Ben-Meir |
| 2017/0270051 A1 | 9/2017 | Chen et al. |
| 2017/0308474 A1 | 10/2017 | Hicks et al. |
| 2018/0018281 A1 | 1/2018 | Bradbury et al. |
| 2018/0239712 A1 | 8/2018 | Lea |
| 2018/0260336 A1 | 9/2018 | Brandt et al. |
| 2020/0065255 A1 | 2/2020 | LeBeane et al. |
| 2020/0174793 A1 | 6/2020 | Campbell et al. |
| 2020/0257635 A1 | 8/2020 | Park et al. |

OTHER PUBLICATIONS

Barr, T.W., et al., "Translation Caching: Skip, Don't Walk (The Page Table)", ISCA'10, Jun. 19-23, 2010, 12 pages.

Yaniv, I., et al., "Hash, Don't Cache (the Page Table)", Sigmetrics '16, Jun. 14-18, 2016, 14 pages.

List of IBM Patents or Patent Applications Treated as Related, dated Aug. 30, 2022, 2 pages.

Margaritov, A., et al., "Prefetched Address Translation," MICRO '52: Proceedings of the 52nd u Annual IEEE/ACM International Symposium on Microarchitecture, Oct. 12-16, 2019, 14 pages.

International Search Report and Written Opinion dated Feb. 23, 2021 received in a related foreign application, namely International Application No. PCT/IB2020/060688, 10 pages.

J. Ahn, S. Jin and J. Huh, "Revisiting hardware-assisted page walks for virtualized systems ," 2012 39th Annual International Symposium on Computer Architecture (I SCA), 2012, pp. 476-487, doi: 10.1109/ISCA.2012.6237041. (Year: 2012).

J. Power, M.D. Hill and D.A. Wood , "Supporting x86-64 address translation for 1 00s of GPU lanes ," 2014 IEEE 20th International Symposium on High Performance Computer Architecture (H PCA) , 2014 , pp. 568-578, doi: 10.1109/HPCA.20 1 4 .6835965. (Year: 2014).

Artemiy Margaritov, Dmitrii Ustiugov, Edouard Bugnion, and Boris Grot. 2019, Prefetched Address Translation. In Proceedings of the 52nd Annual I E E E/ACM International Symposium on Microarchitecture (MICRO '52). Association for Computing Machinery, New York, NY, USA, 1023-1036. (Year: 2019).

B. Gras, K. Razavi, E. Bosman, H. Bos and C. Giuffrida, "ASLR on the Line: Praclical Cache Attacks on the MMU", NDSS, 2017. (Year 2017).

R. Bhargava, B. Serebrin, F. Spadini, and S. Manne. "Accelerating two-dimensional page walks for virtualized systems". (ASPLOS XIII). Association for Computing Machinery, New York, NY, USA, 26-35. DOI:https://doi.org/10.1145/1346281.1346286 (Year: 2008).

TRANSLATING VIRTUAL ADDRESSES IN A VIRTUAL MEMORY BASED SYSTEM

BACKGROUND

The disclosure herein relates generally to data processing, and more particularly, to methods, apparatus, and systems for optimizing address translations in a computer system.

Among other tasks, memory management manages the data stored in a computer including overseeing the retrieval and storage of data from memory in a computer. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

With a virtual memory system, the underlying hardware implementing the memory system of a computer is effectively hidden from the software of the computer. A relatively large virtual memory space is typically used for such a computer, with computer programs that execute on the computer accessing the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map the virtual memory addresses of the of the virtualized address space to real addresses in the physical memory space. As such, whenever a computer program on a computer attempts to access memory using a virtualized address, the computer translates the virtualized address into a corresponding real address so that the access can be made to the appropriate location in the appropriate physical device mapped to the virtualized address.

SUMMARY

The summary of the disclosure is given to aid understanding of a computer system, computer architectural structure, processor, memory system, and method of translating virtual addresses in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In one or more embodiments an information handling system is disclosed. The information system in an embodiment includes a processor for processing data; one or more memory devices having a plurality of locations for storing the data, each location having a physical address; a Page Walk Cache (PWC) for storing a plurality of page directory entries; and a memory controller, preferably local to the memory devices, configured to control reading and writing accesses to the memory devices. The processor, in an aspect, in response to a request to translate a first virtual address to a second address, is configured to: send from the processor to the memory controller a page directory base and a plurality of memory offsets, wherein the plurality of memory offsets includes at least a first level memory offset and a second level memory offset; receive from the memory controller at least one of the plurality of page directory entries; and store in the PWC the at least one of the plurality of page directory entries. The memory controller in an aspect is configured to: receive from the processor a page directory base and a plurality of memory offsets; read from the one or more memory devices a first level page directory entry using the page directory base and the first level memory offset; combine the first level page directory entry with the second level memory offset; read from the one or more memory devices a second level page directory entry using the first level page directory entry and the second level memory offset; and send to the processor at least one of the plurality of page directory entries.

In one or more embodiments, in response to determining that all the plurality of memory offsets have been combined with the plurality of page directory entries, the memory controller is configured to send a page table entry (PTE) to the processor. The memory controller in an aspect is configured to send the first level page directory entry to the processor, and in a further aspect is configured to send the second level page directory entry to the processor or both the first and second level page directory entries. In an embodiment, the processor is configured to combine the page directory base and the first level offset, and to send the plurality of memory offsets together with the combined page directory base and first level offset to the memory controller.

The memory controller in one or more embodiments is further configured to fetch from the one or more memory devices a memory line containing an address of the first level page directory entry. In an aspect, the memory controller is further configured to extract from the memory line containing the address of the first level page directory entry, the address of the first level page directory entry. The system in an aspect is further configured to transmit the memory line containing the address of the first level page directory entry from the memory controller to the processor, and the processor is configured to extract from the memory line containing the address of the first level page directory entry, the address of the first level page directory entry. The processor according to an embodiment is further configured to store in the PWC the first level page directory entry. The memory controller in one or more embodiments is further configured to fetch from the one or more memory devices a memory line containing an address of the second level page directory entry. The memory controller is further configured according to an aspect to extract from the memory line containing the address of the second level page directory entry, the address of the second level page directory entry. The system is configured according to an embodiment to transmit the memory line containing the address of the second level page directory entry from the memory controller to the processor, and the processor is further configured to extract from the memory line containing the address of the second level page directory entry, the address of the second level page directory entry. The processor in an aspect is further configured to store in the PWC at least one of the first level page directory entry, the second level page directory entry, or both.

The memory controller, according to an embodiment, in response to the memory controller receiving the page directory base and the plurality of memory offsets, is configured to control all the memory reading operations for the plurality of page directory entries stored in memory and the system is configured so that all the memory reading operations for the plurality of page directory entries stored in memory originate in the memory controller. The system in one or more embodiments is configured so that all the plurality of memory offsets are transmitted together from the processor to the memory controller, and in an aspect the memory controller is configured to combine the page directory base and first level offset. The memory controller is configured in an aspect to transmit a page table entry (PTE) from the memory controller to the processor, wherein the PTE contains the translation of the first virtual address to the second address. The system is further configured in one or more aspects to send a memory line from the memory controller to the processor that contains an address of a page table entry (PTE), and the processor is configured to extract from the memory line containing the address of the page table entry (PTE), the page table entry (PTE). The memory controller is further configured in an embodiment to combine a third level offset with the second page directory entry and according to an aspect to read from memory a third level page directory entry using the third level offset and the second level page directory entry. The request to translate in one or more embodiments comprises a nested translation having a guest virtual address and a host virtual address.

A computing system is also disclosed that includes a processor for handling data; one or more memory devices having a plurality of locations for storing the data, each location having a physical address; a Page Walk Cache (PWC) for storing a plurality of page directory entries; and a memory controller configured to control reading and writing accesses to the memory devices. In one or more embodiments the computing system also includes a computer-readable storage medium, and in an aspect a non-transitory computer-readable storage medium, comprising program instructions that when executed by the processor, in response to a request to translate a first virtual address to a second address, cause the processor to send from the processor to the memory controller a page directory base and a plurality of memory offsets, wherein the plurality of memory offsets includes at least a first level memory offset and a second level memory offset; receive from the memory controller at least one of a plurality of page directory entries; and store in the PWC the at least one of the plurality of page directory entries. In an aspect the computing system also includes a computer-readable storage medium, and in an embodiment non-transitory computer-readable storage medium, having program instructions that when executed by the memory controller, in response to the request to translate a first virtual address to a second address, cause the memory controller to receive from the processor a page directory base and a plurality of memory offsets; read from the memory devices a first level page directory entry using the page directory base and the first level memory offset; combine the first level page directory entry with the second level memory offset; and read from memory a second level page directory entry using the first level page directory entry and the second level memory offset.

The computing system in an embodiment further has program instructions that when executed by the processor cause the processor to combine the page directory base and the first level memory offset, and to send to the memory controller the plurality of memory offsets together with the combined page directory base and first level memory offset. The program instructions in an aspect, when executed by the memory controller causes the memory controller to fetch from the one or more memory devices a memory line containing an address of at least one of the first level page directory entry or the second level page directory entry (or both), wherein the memory line containing the address of at least one of the first level page directory entry or the second level page directory entry (or both) is transmitted to the processor, and the processor further contains programming instructions that when executed by the processor causes the processor to extract from the memory line the address of at least one of the first level page directory entry or the second level page directory entry (or both) and to store in the PWC the address of the at least one of the first level page directory entry or the second level page directory entry (or both).

A method of translating addresses by a system having a plurality of page directory entries stored in memory is also disclosed. The method in an aspect includes in response to a request to translate a first virtual address to a second address, sending from a processor to a memory controller a page directory base and a plurality of memory offsets, wherein the plurality of memory offsets includes at least a first level memory offset and a second level memory offset; by the memory controller, reading from memory a first level page directory entry using the page directory base and the first level memory offset; combining the second level offset and the first level page directory entry by and in the memory controller; by the memory controller, reading from memory a second level page directory entry using the first level page directory entry and the second level memory offset; sending at least one of the first level page directory entry or the second level page directory entry to the processor; storing the at least one of the first level page directory entry or the second level page directory entry in a Page Walk Cache; and sending a page table entry (PTE) from the memory controller to the processor. The method in an aspect is directed to a radix page translation and the request to translate is directed to a radix page translation where the plurality of page directory entries form part of the radix tree. The method in an aspect further includes combining in the processor the first level memory offset with the page directory base; and sending the remaining memory offsets together with the combination of the page directory base and the first level memory offset from the processor to the memory controller.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of an information handling system, a computer system, computer architectural structure, processor, memory system, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, circuitry, embodiments, or devices shown, and the arrangements, structures, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
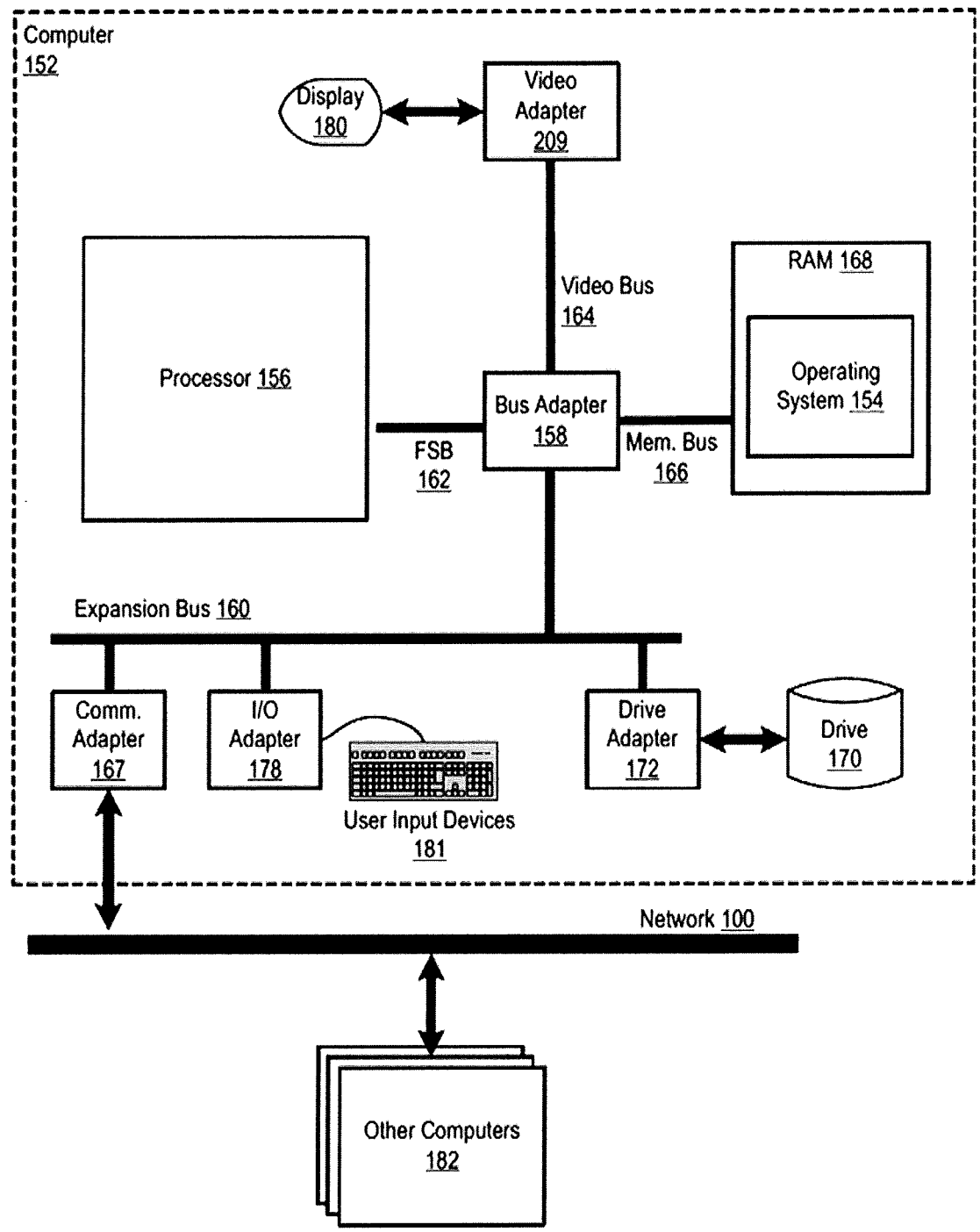
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of information handling systems including computer systems, computer architectural structures, processors, memory systems, and their method of operation, including methods of performing address translation, however, it will be understood by those skilled in the art that different and numerous embodiments of the information handling system, including computer systems, computer architectural structures, processors, memory systems, and their method of operation, including methods and structures for performing address translation, may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors, microprocessor systems, memory systems, and their architectures, which are apparent to those skilled in the art. It is assumed that those skilled in the art are familiar with the general architecture of processors and memory systems and/or devices, and their operation. It may be noted that a numbered element is numbered according to the figure in which the element is introduced, and may be referred by that number in succeeding figures.

In data and information handling systems there are numerous accesses to data stored in the various memory systems, including main memory. Accesses to memory in a virtualized memory system typically require an address translation from the virtual address (VA) to the real address (RA). Due to the frequency of memory access requests in a computer, address translation can have a significant impact on overall system performance. As such it is desirable to minimize the amount of time to provide an address translation. This disclosure addresses this problem through systems and techniques to reduce the amount of time to provide address translation. In one or more embodiments a system and process for speeding up Radix Page Translations (RPT) is disclosed, and in particular RPT table walks by reducing the exchange of data between the processor (CPU) and memory, including the memory controller (MC), during the table walk translation process.

One feature of virtual addressing is that it not necessary for a computer to include storage for the entire virtual memory space in the physical memory devices in the computer's main memory. Instead, lower levels of storage, such as disk drives and other mass storage devices may be used as supplemental storage, with memory addresses grouped into "pages" that are swapped between the main memory and supplemental storage as needed ("paging"). When the processing system uses paging, the low order bits of the virtual address are preserved and used directly as the low order bits of the actual physical address, while the high order bits may be treated as a key or index to one or more address translation tables that correspond or map to physical addresses. The memory referenced by such a range may be called a page. Page sizes may range in size, for example, from 4 Kilobytes to 16 Gigabytes.

Address translation in a virtual memory system typically incorporates accessing various address translation data structures. One such structure, referred to as a page table, includes multiple entries that map virtual addresses to real addresses on a page-by-page basis and includes one or more page table entries (PTEs). Using virtual addressing, processors can access memory using physical addresses that are generated from translating virtual addresses (VA) to physical or real addresses (RA).

The number of entries in a page table required to map all of the memory address space in use by a computer can be significant, and requires the entries to be stored in Giga/Terabyte scale main memory (Random Access memory), rather than dedicated memory associated with the processor, which makes accessing such entries residing in main storage slow. To accelerate address translation, and reduce the latency with obtaining address translations, high speed memories associated with the processor, referred to as translation look-aside buffers (TLB), are typically used to cache recently-used entries for quick access by the computer. A TLB is a data structure used to cache page table entries mapping virtual addresses (VA) to physical addresses or real addresses (RA). With each memory access, the VA is presented to the TLB and if the TLB hits, i.e., the VA of the memory access matches an entry in the TLB, the TLB provides a real address (RA) to the processor. Finding a mapping or match in a given TLB provides a quick translation between a virtual address and a physical address.

Not finding a mapping or match for a virtual address in a given TLB indicates that the page table should be checked, and in one or more embodiments that a table walk through multiple tables and levels will need to be performed in order to translate the virtual address to a real address in physical memory. If the address misses in the TLB, in one or more embodiments a translation process involving a more costly hardware handler or software handler is invoked to handle the translation, and load and insert the page table entry into the TLB so the address will hit in the TLB and the memory access can proceed. The TLB is usually associated with and may be local to the processor (CPU).

There are several conventional approaches to translating virtual addresses to real addresses in physical memory. Radix Page Translation (RPT) is a radix tree based approach for translating virtual addresses (VAs) to real addresses (RAs) in a virtual memory based system. The tree structured page tables (e.g., Radix address translation) approach uses a tree structure in memory. The root of the tree is identified by a physical address in memory, and bits from the virtual address are used as an index at each level of the tree until a page table entry is found. While the final page table entry (PTE) found in the tree structure is cached in a TLB, the intermediate at each level typically are cached in a page walk cache (PWC). In a typical RPT translation it is necessary to "walk" through multiple levels of the radix tree in order to get the translated physical or real address (RA). In typical configurations this walking process is managed entirely by the processor (CPU) and can take a long time because of numerous exchanges between the processor (CPU) and the memory controller (MC).

Address translation typically occurs in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. In some embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
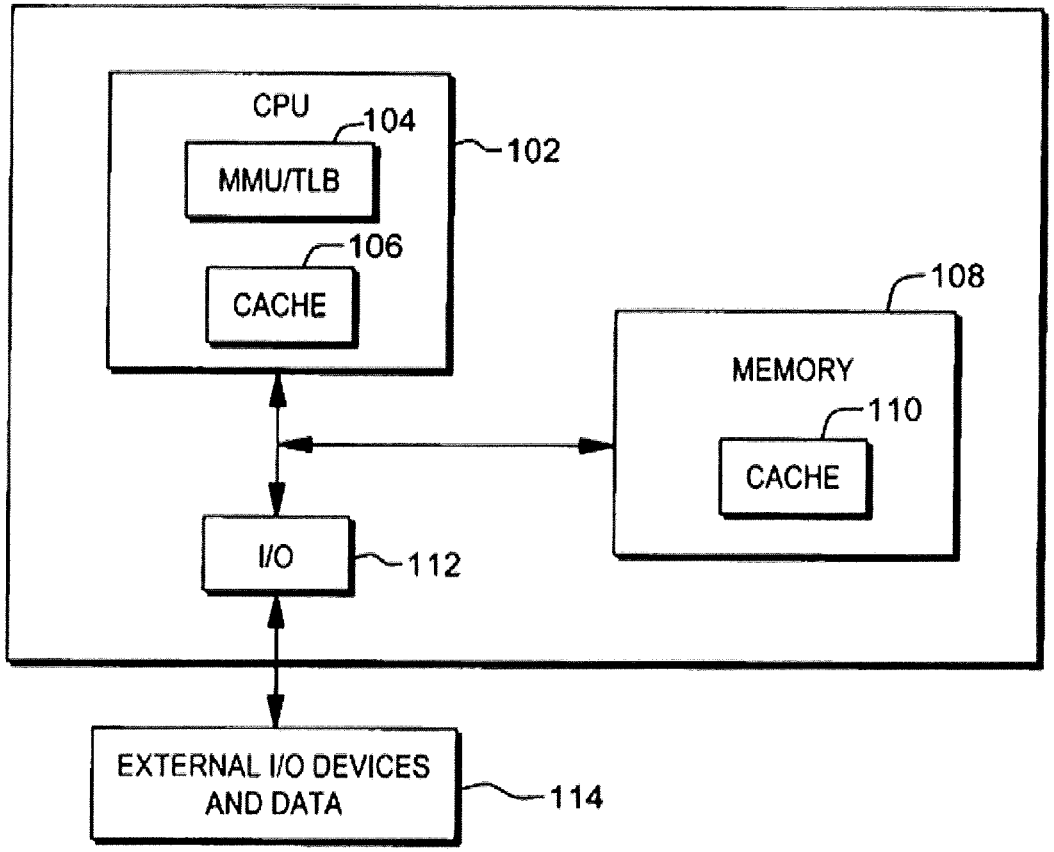
FIG. 2A depicts one example of a computing environment.

One example of a computing environment to incorporate and use one or more aspects of the translation capability is described with reference to FIG. 2A. In one example, a computing environment 100 includes a processor (central processing unit—CPU) 102 that includes at least one memory management unit (MMU)/translation lookaside buffer (TLB) portion 104 and a cache 106. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory. To improve address translation, the memory management unit in an embodiment utilizes a translation lookaside buffer (TLB). The TLB is a cache of previously translated addresses. Thus, when a request is received for a memory access that includes an address to be translated, the TLB is checked first. If the address and its translation are in the TLB, then no translation is necessary. Otherwise, the received virtual address is translated.

Figure 2B:
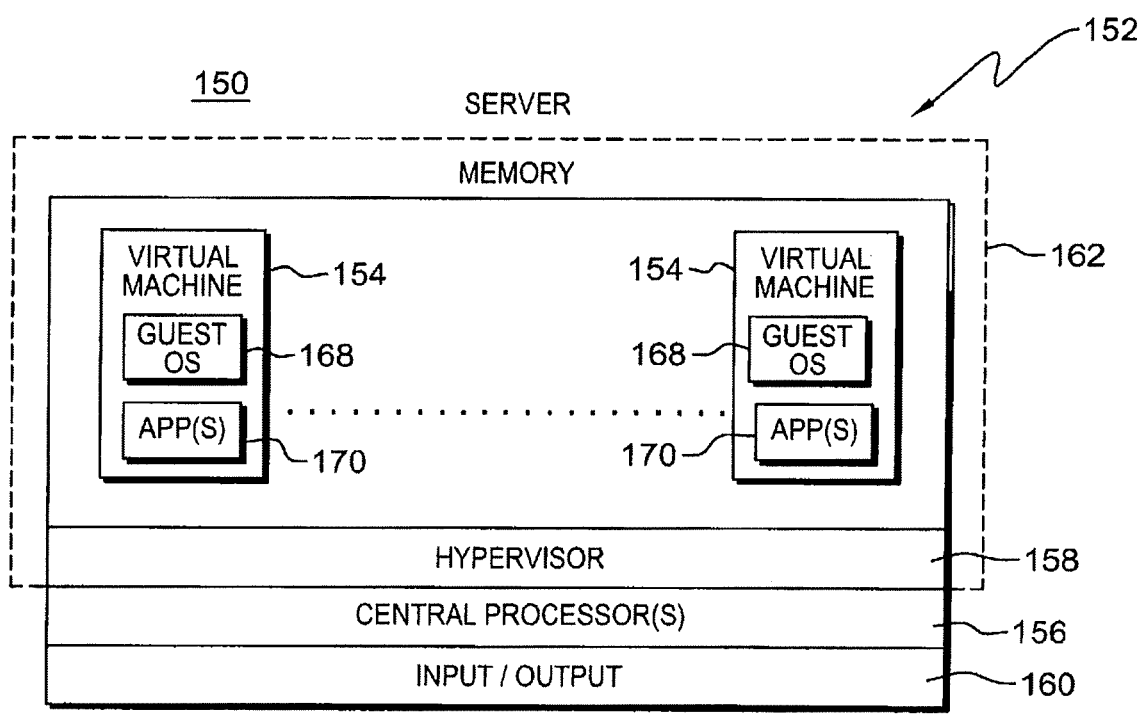
FIG. 2B depicts another example of a computing environment.

A further embodiment of a computing environment to incorporate and use one or more aspects of the present invention is depicted in FIG. 2B. In this example, a computing environment 150 includes a server 152 that includes, for instance, one or more virtual machines 154, one or more central processors (e.g., central processing units) 156, at least one hypervisor 158, and an input/output subsystem 160. The virtual machines and hypervisor are included in memory 162.

In this embodiment, each virtual machine is capable of hosting a guest operating system 168 and may be executing one or more applications 170. An operating system or application running in a virtual machine appears to have access to a full complete system, but in reality, only a portion of it is available.

Central processors 156 (e.g., central processing units) are physical processor resources that are assignable to a virtual machine. For instance, virtual machine 154 includes one or more logical processors, each of which represents all or a share of a physical processor 156 that may be dynamically allocated to the virtual machine. Central processor 156, like CPU 102, includes at least one MMU/TLB portion and at least one cache. Virtual machines 154 are managed by hypervisor 158, such as PowerVM, offered by International Business Machines Corporation, as an example.

Input/output subsystem 160 directs the flow of information between devices and memory (also referred to herein as main memory or main storage). It is coupled to the server in that it can be part of the server or separate therefrom. The I/O subsystem relieves the central processors of the task of communicating directly with the I/O devices coupled to the server and permits data processing to proceed concurrently with I/O processing.

Address translation in a virtual memory system typically incorporates accessing various address data structures. One such structure, referred to as a page table, includes multiple entries that map virtual addresses to real addresses on a page by page basis. The format and information included in the page table entry depends on the architecture of the system configuration and/or the specific type of translation. A page table entry located by traversing hierarchical page tables typical includes various information, including at least a portion of a real address used to access the physical memory.

The address received for translation may include virtual address bits and one or more offsets, including a page offset. The virtual address bits are transmitted to the TLB, which attempts to match the virtual address bits with a real page number stored in the TLB. If the TLB finds an entry containing a real page number matching the virtual address bits, it provides a physical address. The physical address is used to address a page in the physical memory. The page bits or page offset is used to access an address relative to the beginning of the page.

In one embodiment, if a match is not found (TLB miss), the address translation system fetches the physical address from the page table by performing a page walk after a TLB miss. The virtual address resolution system may also load the fetched physical address into one or more of the arrays of the TLB. Furthermore, one or more steps of the page walk, in one or more embodiments, are also installed in the arrays of the Page Walk Cache (PWC). That is, when a page walk is performed, various intermediary entries of the page walk may be saved as page directory entries in the PWC. The page walk steps cached in the PWC arrays allow the processing system to perform subsequent page walks faster since it does not have to perform the cached steps of the page walk, and/or the page walk does not need to start from the beginning.

Radix Page Translation (RPT) is a common and popular method of memory virtualization where the effective/virtual address space is translated to real/physical addresses using a radix tree. RPT is an example of a hierarchical translation table mechanism. The hierarchy of tables is referred to as dynamic address translation (DAT) tables, and for RPT, the tables are referred to as radix tables. For a RPT process, the radix tree (i.e., the radix tables) is stored in physical address space (e.g., main memory) and the root of the tree, also referred to as the page directory base, is stored in a register in the processor (CPU). The radix page table in an embodiment is, for example, a hierarchical, data structure that specifies the mapping between virtual page numbers and real page numbers, virtual page numbers and virtualized real page numbers, or virtualized real page numbers and real page numbers.

In order to perform a radix page table walk (RPT) to convert a virtual address to a real address in physical memory, the processor starts at the root or base of the radix tree and uses a set of the bits from the virtual address as an offset into a page directory entry or table. The page directory entry at the specified offset points to a next-level page directory entry or table. Another set of bits from the virtual address are used to index into this entry/table and pick the next page directory entry/table that will be used. This process continues until the last set of bits is used to find the page table entry (PTE) in the page table. In current systems, this walking process through the tables is managed entirely by the processor CPU and can take a long time in part because of numerous exchanges between the CPU and the memory controller (MC).

One or more embodiments for speeding up RPT table walks are disclosed by increasing the responsibility and operations performed by the memory controller during the table walk process. In one or more embodiments, the memory controller (MC) performs the entire table walk, reducing the number of exchanges between the CPU and the memory/memory controller (MC). In an embodiment, the memory controller performs the entire table walk, and the final page table entry (PTE), and all of the intermediate addresses in the radix tree translation, are transmitted or sent back to the processor (CPU) from the memory controller. This approach reduces latency and allows for caching of the radix tree, e.g., in the Page Walk Caches (PWC), in the processor (CPU). In another embodiment, the memory controller (MC) performs the entire table walk and only the final page table entry (PTE) is sent back from the memory controller to the processor (CPU). This approach reduces latency and eliminates Page Walk Caches (PWC), and in an aspect eliminates Page Walk Caches (PWC) for host translations. In one or more embodiments, the final PTE entry containing the desired translation is available at the processor (CPU) much sooner than existing approaches permit.

Figure 3A:
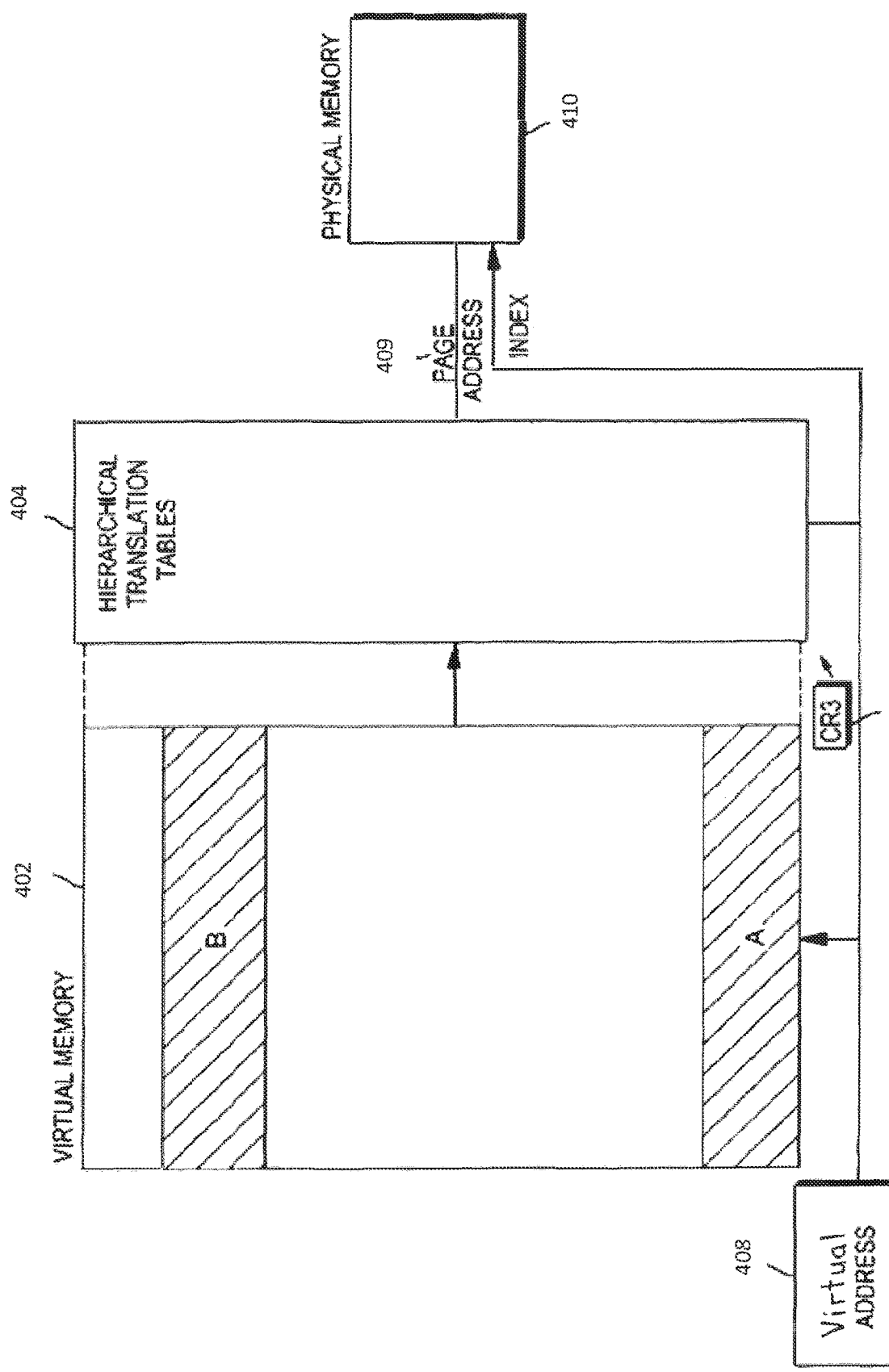
FIG. 3A depicts one example of a hierarchical translation mechanism.

One example of radix page translation is described with reference to FIG. 3A. In this example, translation tables 404 are provided for translating addresses of virtual memory 402 to real addresses. The origin of the highest order translation table of the hierarchical translation tables 404, is provided, for example, by a control register (CR3) 406. An effective or virtual address 408 is used to index into each table of the hierarchical translation tables 404 to determine an origin address of the next table until, for example, a page table entry (PTE) having an address 409 of a page of physical memory 410 is located. In one example in which the translation mechanism utilizes DAT tables, the effective address is a virtual address having a plurality of indices or offsets used to index into the translation tables.

Figure 3B:
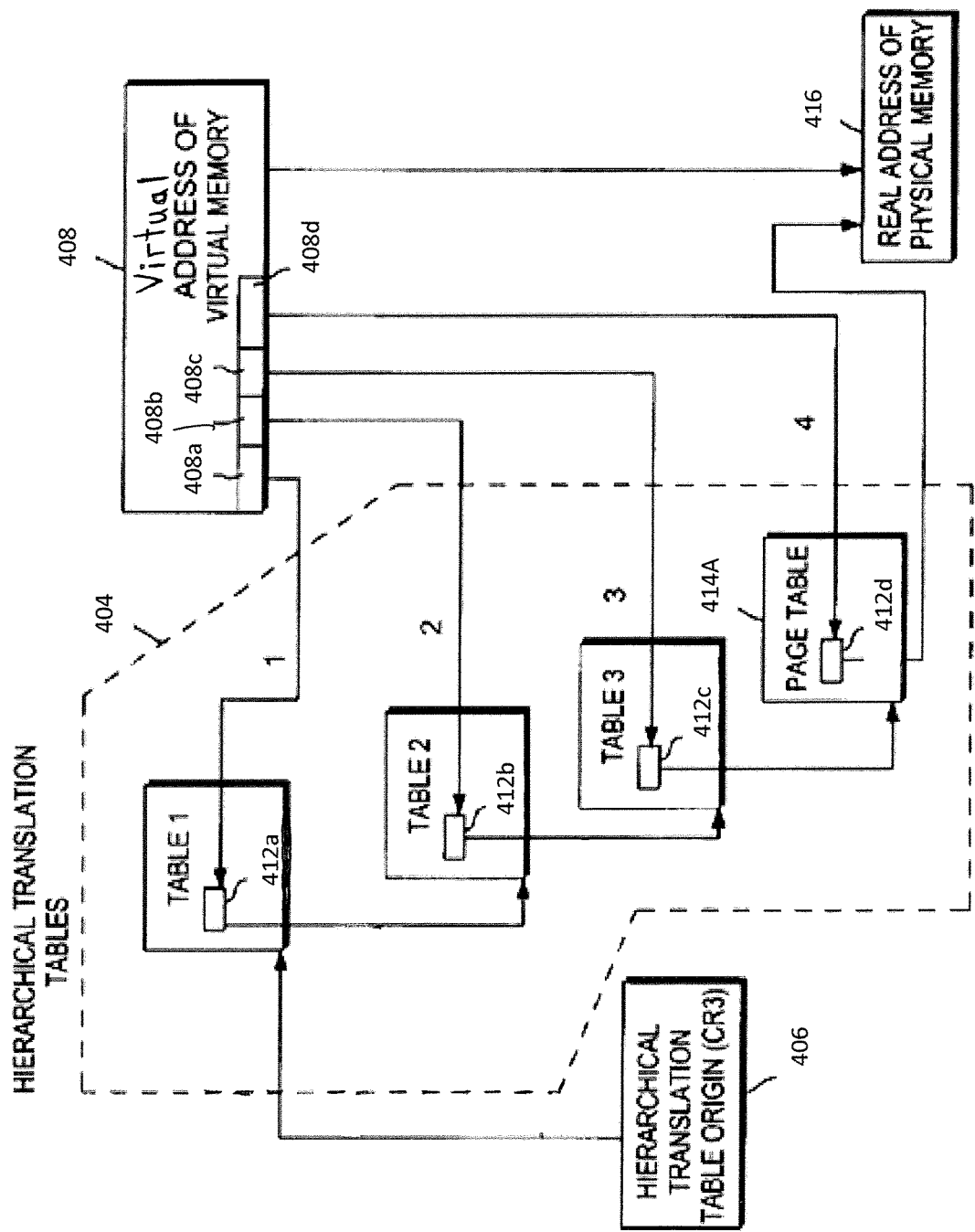
FIG. 3B depicts one example of indexing of high-level translation tables.

FIG. 3B shows a further example of RPT, e.g. a table walk process through the radix tables, in which the highest level translation table of the hierarchy is "indexed" by the high portion 408*a* of an effective or virtual address 408 to locate a Table 1 entry 412*a* that is used to locate the next translation table (Table 2). That is, entry 412*a* in Table 1 includes an origin address of Table 2. Similarly, a next portion 408*b* of the effective or virtual address 408 is used to index into Table 2 to find a Table 2 entry 412*b* having the origin address of Table 3. A next portion 408*c* of the effective or virtual address 408 is used to index into Table 3 to find a Table 3 entry 412*c* having an origin address of Page Table 414*a*. A next portion 408*d* of the effective or virtual address 408 is used to index into Page Table 414*a* to locate a page table entry 412*d* having the address of a physical memory page 416. The origin of the hierarchy of translation tables, in one embodiment, may include a table selector field for determining which of the hierarchy of translation tables, to start the translation. Thus, the translation may require only a subset of the hierarchy (wherein an effective address is limited to include a predetermined number of most significant bits having a zero value). A translation using fewer tables will be faster than one using more tables.

Figure 4:
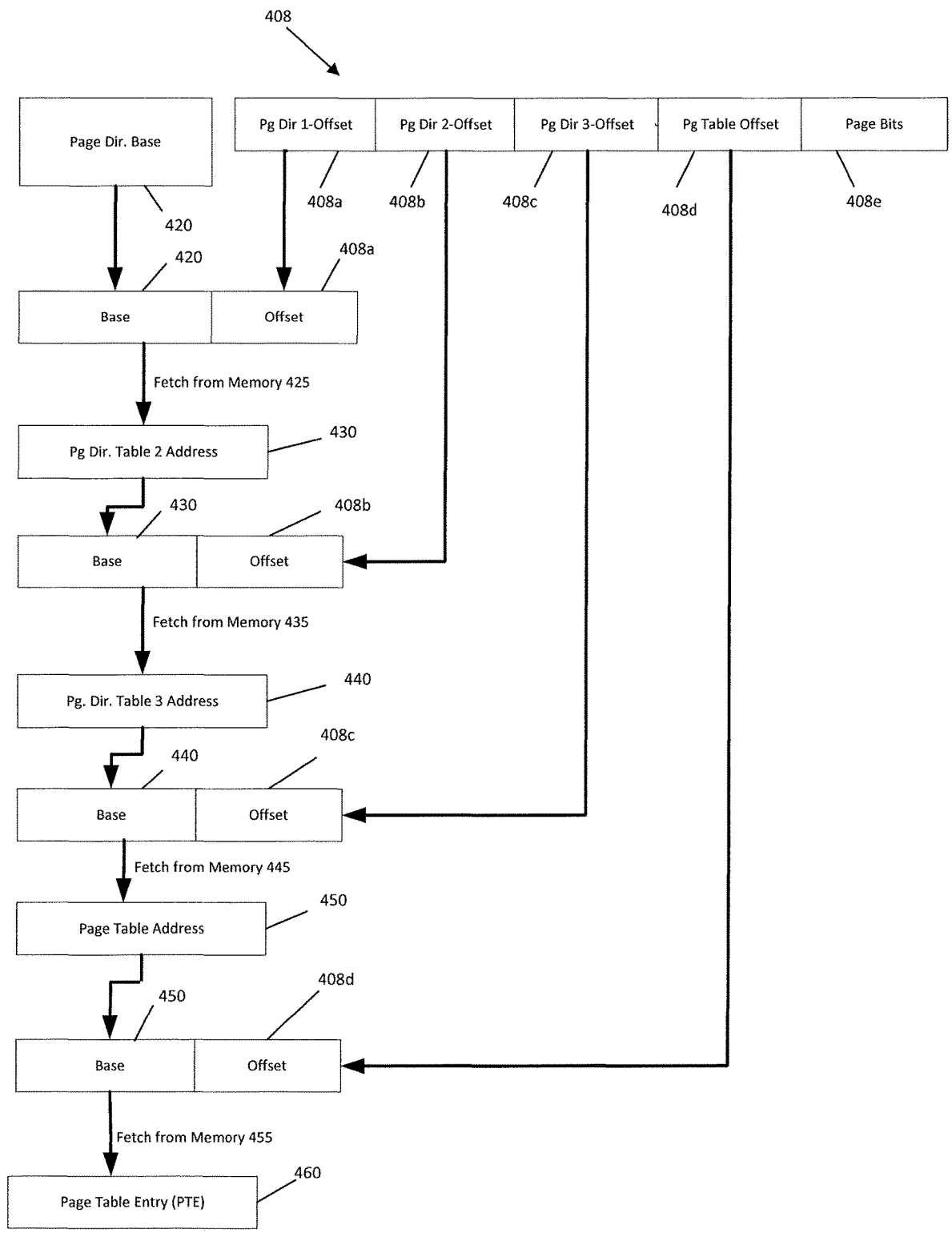
FIG. 4 depicts another example of a hierarchical translation mechanism, according to embodiments of the present disclosure.
Figure 5:
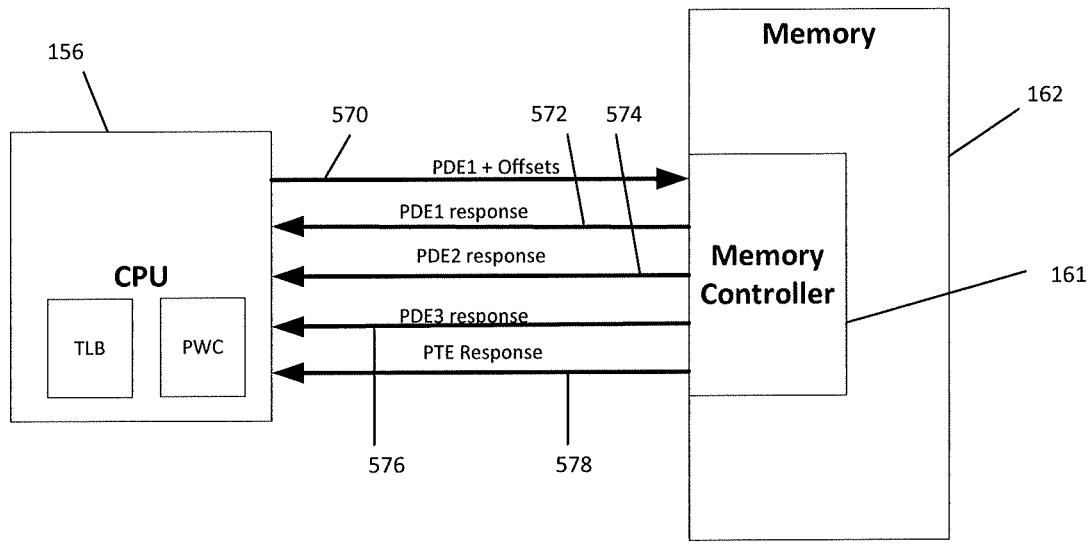
FIG. 5 illustrates a block diagram of a processor and memory controller undergoing an embodiment of translating a virtual address.
Figure 6:
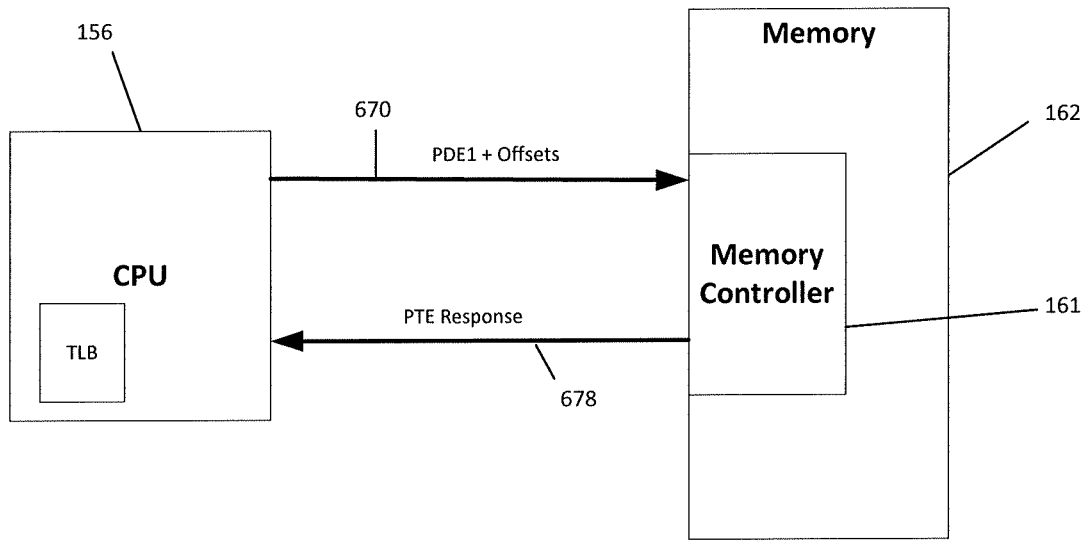
FIG. 6 illustrates a block diagram of a processor and memory controller undergoing another embodiment of translating a virtual address.

FIG. 4 illustrates a block diagram of another example of a RPT process where a virtual address space is translated to physical addresses using a radix tree, e.g., performing a table walk through the multiple levels of the radix tree. The processor (CPU) 156 is remote from memory 162. FIGS. 5 and 6 illustrate a block diagram of the processor (CPU) 156 and memory 162 and the exchange of data between the processor 156 and memory controller 161, where the memory controller 161 is associated with and local to memory 162. In one or more embodiments, memory 162 contains one or more memory cards (not shown) where each memory card has a memory controller 161 and one or more DRAMs (not shown) to store data. In the examples of FIGS. 4, 5 and 6, 48-bit addressing is used as an example for the purpose of description and not as a limitation on the illustrative embodiments. The translating process ca be practiced with an addressing system of any size (bit width) in a manner described herein and is contemplated within the scope of the illustrative embodiments.

In the examples of FIGS. 4, 5 and 6, the lowest 16 bits 408*e* of the 48 bit virtual address are the page offset (assuming a 64 KB page), and provide the address to locate the desired, translated real address on the page in memory. The next 8 bits 408*d* are the offset into the page table, while the next three sets of 8 bits, 408*c*, 408*b*, and 408*a*, are offsets into different levels of page directories. To perform the table walk, portions of the virtual address 408 are sent by the processor (CPU) 156 to the memory controller (MC) 161 along with the page directory base 420, which is also referred to as the page directory root 420. In particular, typically all upper portions of the virtual address 408 except for the page offset bits, e.g., page bits 408*e*, are sent to the memory controller 161 by the processor (CPU) 156. In the example of FIGS. 4, 5, and 6, page directory 1-offset 408*a*, page directory 2-offset 408*b*, page directory 3-offset 408*c*, and page table offset 408*d*, along with the page directory root or base 420, are sent to the memory controller 161 as illustrated by 570 and 670 in FIGS. 5 and 6, respectively. That is, in one or more embodiments, the Page Directory Entry 1 (PDE1), which refer to the Page Directory Base 420 plus the page directory 1-offset 408*a*, with the offsets, e.g., 408*b*, 408*c*, and 408*d*, as shown by 570 and 670 are sent by the CPU 156 to the memory controller 161 at the outset of the translation. In other words, in an embodiment all the offsets (408*a*, 408*b*, 408*c*, and 408*d*) are all sent together, and in an aspect, with the Page Directory Base 420 or sequentially with the Page Directory Base 420, from the processor 156 to the memory controller 161 over the bus between the processor (CPU) 156 and the memory 162. A new instruction is used to transmit the page directory 2-offset 408*b*, the page directory 3-offset bit 408*c*, and the page table offset 408*d*, with the page directory 1-offset 408*a* and the page directory base 420, as in previous methods of translation both the page directory 1-offset 408*a* and the page directory root or base 420 were initially transmitted by the processor 156 to the memory controller 161 prior to and without the other offsets 408*b*, 408*c*, or 408*d*.

The page directory root or base 420 is provided by the operating system, and in an aspect the page directory base 420 is based on the thread of the virtual address that is being translated. According to an embodiment, to perform the table walk, the page directory 1-offset 408*a* is added to the page directory base 420 in and by the memory controller 161, and a memory access is performed as shown at 425 in FIG. 4 to read this memory location. In an aspect, the memory fetch 425 obtains information and data from the DRAMS located on the memory card with the memory controller 161. The page directory base 420 serves to identify the address of a table or directory and the page directory 1-offset 408*a* serves as an index into the table identified by the page directory base 420. That entry in the table, e.g., the memory location identified by the address at that entry in the table, contains the base of the level-2 page directory entry, e.g., the Page Directory Table 2 Address 430, for the translation. The memory fetch 425 in one or more embodiments obtains from memory more than the indexed entry to the translation table, and in an aspect obtains information that will be stored in one or more caches associated with the processor, e.g., L2/L3 caches. According to an embodiment where the intermediaries of the translation are stored in the processor 156, and in an aspect in the Page Walk Cache (PWC) in the processor 156, the PDE1 response 572 in FIG. 5 is sent from the memory controller 161 to the processor (CPU) 156. The PDE1 response 572 in an aspect contains the information fetched from memory at 425, and in a further aspect includes the Page Directory Table Address. In one or more embodiments, the Page Directory Table 2 Address is stored in the PWC, and in an aspect the Page Directory Table 2 Address is stored by the processor 156 in the PWC.

Continuing with the translation, the page directory 2-offset 408*b* is added to the directory base (Page Directory Table 2 Address) 430 in and by the memory controller 161, and a memory access is performed as shown at 435 in FIG. 4 to read this memory location. In an aspect, the memory fetch 435 obtains information and data from the DRAMS located on the memory card with the memory controller 161. The Page Directory Table 2 Address 430 serves to identify the address of a table or directory and the page directory 2-offset 408*b* serves as an index into the table identified by the page directory base 430. This memory location contains the base of the level-3 page directory entry, e.g. the Page Directory Table 3 Address 440, for the translation. The memory fetch 435 in one or more embodiments obtains from memory more than the indexed entry to the translation table, and in an aspect obtains information that will be stored in one or more caches associated with the processor, e.g., L2/L3 caches. According to an embodiment where the intermediaries of the translation are stored in the processor, and in an aspect in the Page Walk Cache (PWC), the PDE2 response 574 in FIG. 5 is sent from the memory controller 161 to the processor (CPU) 156. The PDE2 response 574 in an aspect contains the information fetched from memory at 435, and in a further aspect includes the Page Directory Table 3 Address. In one or more embodiments, the Page Directory Table 3 Address is stored in the PWC, and in an aspect is stored by the processor 156 in the PWC.

Continuing further with the translation, if the virtual address 408 being translated has additional offset bits that were sent to the memory controller 161, the page directory 3-offset 408*c* is added to the directory base (Page Directory Table 3 Address) 440 in and by the memory controller 161, and a memory access is performed as shown at 445 in FIG. 4 to read this memory location. In an aspect, the memory fetch 445 obtains information and data from the DRAMS located on the memory card with the memory controller 161. The Page Directory Table 3 address 440 serves to identify the address of a table or directory and the page directory 3-offset 408*c* serves as an index into the table identified by the page directory base 440. This memory location contains the base of the page table offset entry, e.g. the Page Table Address 450, for the translation. The memory fetch 445 in one or more embodiments obtains from memory more than the indexed entry to the translation table, and in an aspect obtains information that will be stored in one or more caches associated with the processor, e.g., L2/L3 caches. According to an embodiment where the intermediaries of the translation are stored in the processor, and in an aspect in the Page Walk Cache (PWC), the PDE3 response 576 in FIG. 5 is sent from the memory controller 161 to the processor (CPU) 156. The PDE3 response 576 in an aspect contains the information fetched from memory at 445, and in a further aspect includes the Page Table Address. In one or more embodiments the Page Table Address is stored in the PWC, and in an aspect is stored by the processor 156 in the PWC.

Continuing further down the page table walk to obtain the address translation, the page table offset 408*d* is added to the directory base (Page Table Address) 450 in and by the memory controller 161, and a memory access is performed as shown at 455 in FIG. 4 to obtain the Page Table Entry (PTE) 460. In an aspect, the memory fetch 455 obtains information and data from the DRAMS located on the memory card with the memory controller 161. The Page Table Address 450 serves to identify the address of a table or directory and the page table offset 408*d* serves as an index into the table identified by the Page Table Address 450. This memory location contains the Page Table Entry 460 for the translation. The PTE response 578 in FIG. 5 is sent from the memory controller 161 to the processor (CPU) 156. Similarly, in the translation process of FIG. 6, the PTE response 678 is sent from the memory controller 161 to the processor (CPU) 156. The PTE response 578 and 678 in an aspect contains the information fetched from memory at 455, and in a further aspect includes the page table entry (PTE) 460. In one or more embodiments the page table entry (PTE) 460 is stored in the TLB, and in an aspect is stored by the processor 156 in the TLB.

In one or more embodiments, as illustrated in FIGS. 5 and 6, all the offsets into the directory tables along with the Page Base Root directory are sent from the processor to the memory controller, preferably at the initiation of the table walk process, and preferably together. The memory controller instead of the processor in one or more embodiments performs the table walk, e.g., the memory controller adds the offsets to the base tables/directories, and the memory accesses emanate from the memory controller. That is the memory controller will read memory, e.g., the DRAMs, and add the offsets. In both approaches of FIGS. 5 and 6, the memory controller performs the pointer chasing process during translation instead of the processor (CPU).

In the embodiment of FIG. 6, only the last memory line access, e.g., that contains the Page Table Entry (PTE) 460, is sent back to the processor, and preferably is stored in the TLB in the processor. In the embodiment of FIG. 6, the intermediary memory accesses, e.g., that contain the intermediary directories 430, 440, and 450, are not sent back to the processor, and the intermediary directories are not stored in any Page Walk Caches (PWCs). In the embodiment of FIG. 5, one or more of the intermediary memory accesses, e.g, that contain the Page Directory Table 2 Entry/Address 430, Page Directory Table 3 Entry/Address 440, and Page Directory Table Entry/Address 450, and preferably all the intermediary memory accesses, in addition to the Page Table Entry 460, from FIG. 4 are transmitted from the memory controller 161 to the processor 156. The intermediary directory entries 430, 440, and 450 contained in the intermediary memory accesses sent back to the processor can be stored in one or more Page Walk Caches (PWCs), while the Page Table Entry (PTE) can be stored in the TLB. For example, the intermediate entries (412*a*, 412*b*, and 412*c*) of the translation or table walk illustrated in FIG. 3B are transmitted back to the processor, and preferably are stored in the PWCs, while the page table entry 412*d* from the translation or table walk illustrated in FIG. 3B is transmitted back to the processor and stored in the TLB. While the embodiment of FIG. 5 illustrates all the intermediary translations, e.g., the base tables or directories, being transmitted back to the processor, it can be appreciated that less than all and any combination of the intermediary memory accesses, e.g., the intermediary directory entries, can be transmitted back to the processor, and in an aspect stored in one or more Page Walk Caches (PWCs).

In the FIG. 6 embodiment, the latency of processing the translation could be reduced over the FIG. 5 embodiment in situations where the memory controller is saturated with requests, as only the PTE response 678 is transmitted back to the processor. While the FIG. 6 embodiment should complete the translation (the table walk) quicker, the processor, however does not have the benefit of the intermediary Page Table directories stored in the Page Walk Caches (PWCs). Accordingly, whether the intermediary translations are saved in the PWC is a matter of design choice including whether to include a cache or cache large enough to store the intermediary directory translations in the hope of reducing future table walk latency.

In a typical modern microprocessor, the processor adds the offsets to the Base directory in the processor, the processor sends the Base and Offsets, e.g., Base 420+Offset 408*a*, or Base 430+Offset 408*b*, to memory to fetch the next Base, and the response, e.g., the memory access results, are sent back to the processor. Such a memory access exchange is on the order of 300 cycles, so to traverse the table walk of FIG. 4 with such a system configuration would take on the order of 1200 cycles. In a virtualized environment as shown in FIG. 2B where the guest operating system implements a radix page translation tree on top of the hypervisor's Radix Page Table, a single guest translation could require numerous memory exchanges between the processor and memory, for example 24 memory exchanges totaling 7200 cycles. In the embodiments where the translation is performed in the memory controller, those memory access exchanges between the processor and memory are eliminated reducing the latency involved in the table walk process. There is still a memory access to obtain the information that is residing in memory, but those memory accesses are controlled by the memory controller that is local to, and often on the same card, as the memory devices, e.g., the DRAMs. In other words, the memory fetch request does not emanate from the processor and does not have to traverse the bus between the processor and memory.

The benefit of the two approaches is that the number of exchanges back and forth between the processor and the memory/memory controller are reduced. The system and translation process according to these embodiments do not incur as many round trip exchanges between the processor and the memory/memory controller and thus do not incur the latency associated with traversing the bus between the processor 156 and memory 162 for these memory accesses. For example, in the embodiment of FIG. 6, there preferably is one memory access request 670 sent by the processor 156 to the memory controller 161, and one response 678, e.g., the memory access line containing the page table entry, sent back from the memory controller 161 to the processor 156. It is contemplated that the single response back by the memory controller to the processor will take longer, e.g., 500 cycles, than one of the multiple memory accesses according to the typical technique, since there will be multiple accesses to memory as the memory controller walks the translations through the various tables/directories. That single exchange between the processor and memory controller however will reduce the total latency to walk the radix tree, e.g. to obtain the translation (the PTE 460).

The translation process illustrated in FIG. 5 can in one or more embodiments consume the same bandwidth as existing table walk processes and take longer than the translation process of FIG. 6, but still reduce latency over existing techniques while having the benefit of the intermediary addresses (intermediary tables/directories) stored in the Page Walk Caches in the processor. Sending the intermediary addresses for the intermediary tables and directories from the memory controller back to the processor could slow the translation process of FIG. 5 compared to FIG. 6, but likely not significantly. It is contemplated in an embodiment that transmitting each of the intermediary responses, e.g. PDE response 572, PDE2 response 574, and PDE3 response 576, will take about 60-70 cycles, but would be less than the 300 cycles to perform each round trip exchange between the processor and memory. In one or more embodiments, the memory controller can be aware of the presence or absence of the intermediate addresses in the CPU cache, e.g., in Page Walk Tables (PWCs), and in one or more aspects the memory controller can send only the required memory lines. In this manner, the benefits of caching the intermediate addresses, e.g., for the intermediate tables/directories, in a Page Walk Cache (PWC) are preserved, but the latency of any table walk that does not hit in the last level Page Walk Cache (Page Directory Table 3 Address 440 in FIG. 4) will be improved.

While the embodiments of the address translation process in FIGS. 5 and 6 illustrate a single level translation, e.g., single level translation of a virtual address to a real address, the address translation processes of FIGS. 5 and 6, and combinations thereof, can also be used in nested translations. In nested translations, for example where a virtual machine hosts a guest as shown in FIG. 2B, where a guest process uses radix translation running on a host running radix translation, there will be multiple levels of RPT. The guest translation will have intermediate translations, e.g., PDE2, PDE3 and PTE addresses, and the PDE2, PDE3, and PTE addresses associated with each memory access for the guest (the PDE2, PDE3 and PTE for the host level). By utilizing the translation process of FIGS. 5 and 6 on the various guest and host level translations, further reduction of latency in translation can be achieved. The nested translation can also use combinations of the processes of FIGS. 5 and 6. For example, the intermediate information, e.g., the entries in the Page Walk Cache and/or TLB, for the host translation will not be stored as illustrated in part by the process of FIG. 6, while the intermediate information, e.g., the entries in the Page Walk Cache, will be stored for the guest as illustrated by the process of FIG. 5. That is the intermediaries are not stored for the host translation memory accesses but the intermediaries are stored for the guest translation memory accesses. By utilizing this hybrid approach for nested address translations the footprint would be reduced by creating the appearance of only one level of translation by not storing any intermediate information, e.g., no intermediate directory addresses, for the host translations, while storing the intermediate information for the guest translations. The reduction in footprint could offset any losses from not storing the intermediate addresses for the host because of area reduction, power reduction and better utilization of the TLB for guest translation that continue to be cached. For example, a virtualized system where a guest is running on a host, it could become necessary under existing processes to store 18 PWC entries and 6 TLB entries for one nested translation, whereas utilizing the hybrid (combined) approach only 3 PWC entries and a six TLB would be stored thus saving processor area reduction and power reduction.

Figure 7:
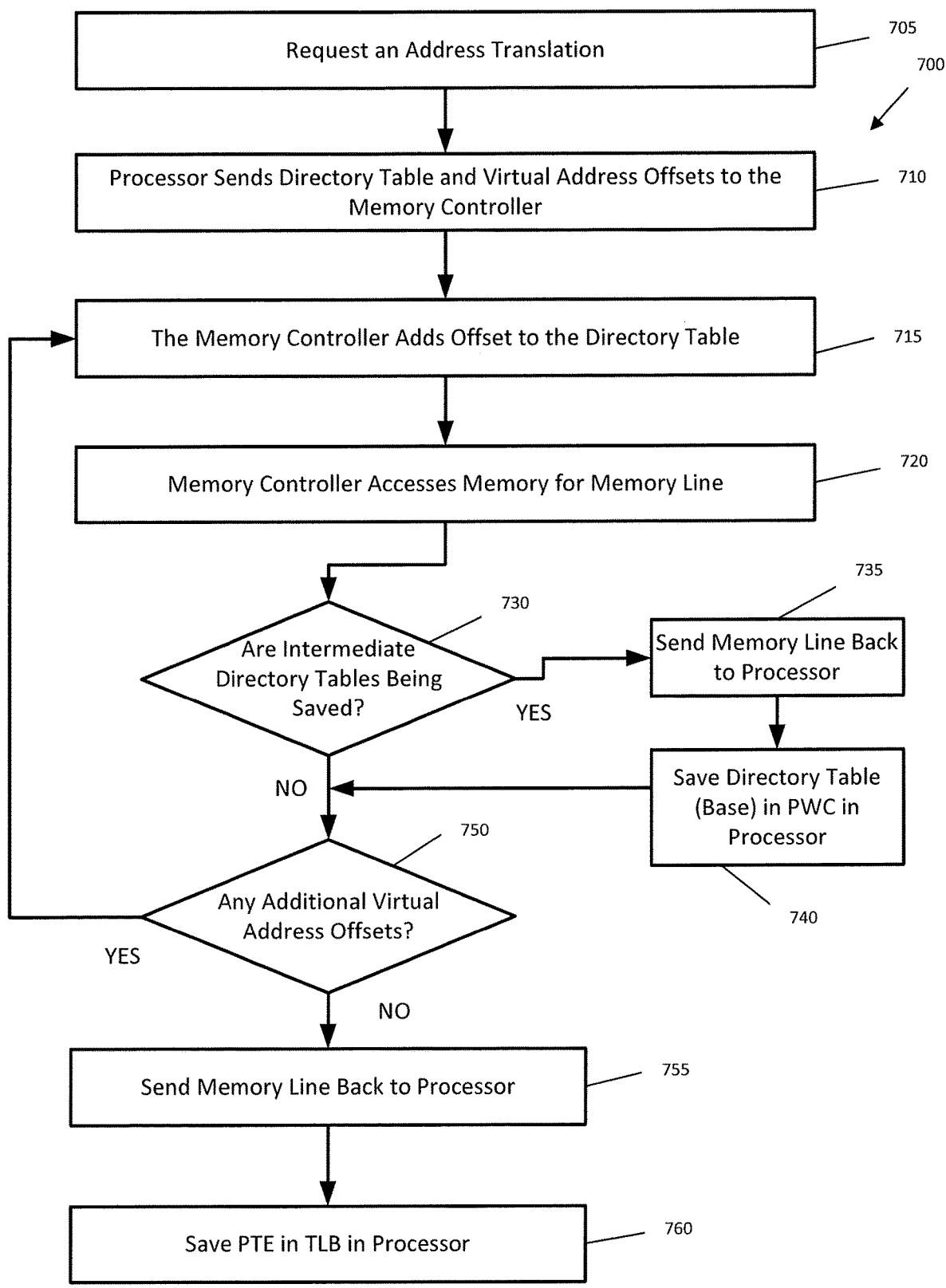
FIG. 7 illustrates a flowchart of an embodiment of a method of translating a virtual address to a physical address.

FIG. 7 is an exemplary flowchart in accordance with one embodiment illustrating and describing one or more methods of handling data, including in an embodiment, processing address translations, e.g., Radix Page Translations (RPT) in accordance with one or more embodiments of the present disclosure. More specifically, the disclosed methods in an aspect are directed to performing a table walk to obtain an address translation preferably with the memory controller performing the table walk. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

The method 700 in FIG. 7 relates to processing data in an information handling system, and more particularly to processing address translations, for example virtual addresses to real addresses in a virtualized memory system, including in embodiments processing nested address translations. In an information handling system, the processor handles instructions including requests to load data from memory. Often the requests or instructions to load data from memory include virtual addresses to the location(s) in memory where the required data is located and those virtual addresses need to be translated into real addresses in the physical memory devices. A request for an address translation is made at 705. The request for address translation could be from an instruction decoded and issued to the processor. At 710, the processor sends the base directory and the virtual address offsets to the memory controller. In one or more embodiments, at 710, the processor sends all the virtual memory offsets to the memory controller together, preferably with the base directory. In an embodiment, at 710, the processor adds the first level virtual address to the base directory and sends the combined base directory and first level offset to the memory controller with the remaining virtual memory offsets. It can be appreciated that all the virtual memory offsets except for the page bits, e.g., all the virtual address bits except for the address bits specifying the location on the page of memory, can be sent from the processor to the memory controller.

At 715, in one embodiment, the memory controller adds the Offset sent by the processor to the base directory. In the first instance of address translation, the first level offset is added to the base directory at 715. In the instance where the processor added the first level offset to the base directory, the memory controller does not perform this combination. At 720 the memory controller accesses memory for the memory line indicated by the base and offset. In one or more embodiments, the memory controller combines or adds the offset to the directory table, e.g., uses the offset and the current directory table or base to look-up and fetch the next directory table. If this is the first level of memory translation, the memory controller accesses memory for the memory line indicated by the base and the first level offset. As discussed above, the offset bits in an aspect represent an index into the directory table, and the memory controller accesses memory at 720 for the memory line corresponding to the entry in the directory table. In an embodiment, the memory line read by the memory controller contains the address for the next directory table. In one or more embodiments the memory controller extracts the address for the next directory table as the memory line read from memory might contain a chunk of data including more than just the directory table address.

At 730, it is determined whether the translation process is saving the intermediate base directory addresses. If the system is saving the intermediate Directory Table addresses (730: Yes), then at 735 the memory line accessed by the memory controller at 720 is sent back to the processor. In an aspect the entire memory line is sent back to the processor at 735, or in one or more embodiments, the intermediary Directory Table address is sent back to the processor. At 740, the intermediary Directory Table Address is saved in the Page Walk Cache in the processor. In an aspect, where the memory line sent back to the processor has more data than just the Directory Table address, the processor extracts and saves the address for the intermediary Directory Table address in the Page Walk Cache. The process after 740 continues to 750.

At 730, if it is determined that intermediate Directory Tables are not being saved (730: No), then the process continues to 750 where it is determined whether there are any additional offsets in the virtual address received by the memory controller. Thus if the translation process is operating according to the embodiment of FIG. 6, the process would proceed from 730 to 750, skipping steps 735 and 740. If at 750 it is determined that there are additional offset to the virtual address (750: Yes), then the process proceeds back to step 715, where the memory controller adds the offset to the Directory Table. In the instance where the process is returning to process step 715, the Directory Table to which the next level offset is added (is indexed into) is the Directory Table that is at the address returned from the memory access at 720, and in an aspect, the address specified by the entry identified in the previous Directory Table. The memory controller thereafter proceeds to 720 where the memory controller accesses (reads) memory again this time for the memory line containing the next Directory Table. The process continues through steps 715, 720, 730, 735, and 740 until at 750 there are no more virtual address offsets (750: No). In other words, the process 700 continues until the table walk is complete at 750.

If at 750 there are no more virtual address offsets (750: No), the table walk is complete and at 755 the memory line from the memory access at 720 is sent to the processor. In an embodiment the Page Table Entry (PTE) can be extracted from the memory line read at 720 and the PTE can be sent to the Processor. At 760 the PTE is saved in the TLB in the processor. In the situation where the memory line sent back to the processor at 755 contains more than just the PTE, the processor extracts the PTE and stores it in the TLB at 760. Future requests for this address translation should hit in the TLB.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of translating virtual addresses to second addresses by a memory controller local to one or more memory devices having a plurality of locations for storing data, each location having a second address, wherein the memory controller is configured to control reading and writing accesses and is not local to a processor, a Translation Buffer (TB) for storing a plurality of Page Table Entries (PTE), or a Page Walk Cache (PWC) for storing a plurality of page directory entries, the method comprising:
   receiving by the memory controller from the processor a page directory base and a plurality of memory offsets, wherein the plurality of memory offsets includes at least a first level memory offset and a second level memory offset;
   reading by the memory controller a first level page directory entry using the page directory base and the first level memory offset;
   combining the second level memory offset and the first level page directory entry by the memory controller;
   reading by the memory controller a second level page directory entry using the first level page directory entry and the second level memory offset;
   sending, by the memory controller to the processor for storing in a PWC on the processor, at least one of a group consisting of the first level page directory entry, the second level page directory entry, and combinations thereof; and
   sending a page table entry (PTE) by the memory controller to the processor for storing in a TB on the processor.

2. The method according to claim 1, further comprising determining whether all the plurality of memory offsets have been combined with the plurality of page directory entries to obtain a PTE.

3. The method according to claim 2, further comprising sending, in response to determining that all the plurality of memory offsets have been combined with the plurality of page directory entries to obtain the PTE, the PTE by the memory controller to the processor.

4. The method according to claim 1, further comprising sending the first level page directory entry by the memory controller to the processor.

5. The method according to claim 4, further comprising sending the second level page directory entry by the memory controller to the processor.

6. The method according to claim 1, wherein the page directory base comprises a combination of a first page directory base and the first level memory offset; and the method comprises reading by the memory controller the first level page directory entry using the combination of the first page directory base and the first level memory offset.

7. The method according to claim 1, further comprising fetching by the memory controller from the one or more memory devices a memory line containing an address of the first level page directory entry.

8. The method according to claim 7, further comprising extracting by the memory controller, from the memory line containing the address of the first level page directory entry, the address of the first level page directory entry.

9. The method according to claim 7, further comprising transmitting by the memory controller the memory line containing the address of the first level page directory entry to the processor.

10. The method according to claim 7, further comprising fetching by the memory controller from the one or more memory devices a memory line containing an address of the second level page directory entry.

11. The method according to claim 10, further comprising extracting by the memory controller, from the memory line containing the address of the second level page directory entry, the address of the second level page directory entry.

12. The method according to claim 10, further comprising transmitting the memory line containing the address of the second level page directory entry by the memory controller to the processor.

13. The method according to claim 1, further comprising originating and controlling by the memory controller all the reading operations for the plurality of page directory entries stored in the one or more memory devices.

14. The method according to claim 1, further comprising receiving by the memory controller all the plurality of memory offsets together.

15. The method according to claim 1, further comprising combining by the memory controller the page directory base and first level memory offset.

16. The method according to claim 1, further comprising:
   combining by the memory controller a third level offset with the second level page directory entry; and
   reading from the one or more memory devices a third level page directory entry using the third level offset and the second level page directory entry.

17. The method according to claim 1, wherein the address translation comprises at least one of a group consisting of: a nested translation having a guest virtual address and a host virtual address; a radix page translation wherein the page directory entries form part of a radix tree; and a combination thereof.

18. A method of translating a virtual address to a second address in a memory module having a memory controller and a plurality of memory devices for storing data, wherein the memory module is remote from a processor, a translation buffer (TB) for storing a plurality of Page Table Entries (PTE), and a Page Walk Cache for storing a plurality of page directory entries, the method comprising:
receiving by the memory controller from the processor a page directory base combined with a first level memory offset and at least a second level memory offset;
reading by the memory controller a first level page directory entry using the page directory base combined with the first level memory offset;
combining the second level memory offset and the first level page directory entry by the memory controller;
reading by the memory controller a second level page directory entry using the first level page directory entry and the second level memory offset;
sending, by the memory controller to the processor for storing in a PWC on the processor, at least one of a group consisting of the first level page directory entry, the second level page directory entry, and combinations thereof; and
sending a page table entry (PTE) by the memory controller to the processor for storing in a TB on the processor.

19. A computer program product for translating a virtual address to a second address in a memory module having a memory controller and one or more memory devices having a plurality of locations for storing data, each location having a physical address, wherein the memory module is remote from a processor, a translation buffer (TB) for storing a plurality of Page Table Entries (PTE), and a Page Walk Cache for storing a plurality of page directory entries, the computer program product comprising:
one or more computer readable storage media, and program instructions collectively stored on the one or more computer readable storage media, the program instructions comprising:
program instructions to receive by the memory controller from the processor a page directory base and a plurality of memory offsets, wherein the plurality of memory offsets includes at least a first level memory offset and a second level memory offset;
program instructions to read by the memory controller a first level page directory entry using the page directory base and the first level memory offset;
program instructions to combine the second level memory offset and the first level page directory entry by and in the memory controller;
program instructions to read by the memory controller a second level page directory entry using the first level page directory entry and the second level memory offset;
program instructions to send, by the memory controller to the processor for storing in a PWC on the processor, at least one of a group consisting of the first level page directory entry, the second level page directory entry, and combinations thereof; and
program instructions to send a page table entry (PTE) by the memory controller to the processor for storing in a TB on the processor.

20. The computer program product according to claim 19, further comprising:
programming instructions to receive by the memory controller all the plurality of memory offsets;
programming instructions to combine the page directory base and the first level memory offset;
programming instructions to fetch by the memory controller from the one or more memory devices a memory line containing an address of the first level page directory entry;
programming instructions to extract by the memory controller from the memory line containing the address of the first level page directory, the address of the first level page directory;
programming instructions to fetch by the memory controller from the one or more memory devices a memory line containing an address of the second level page directory;
programming instructions to extract by the memory controller from the memory line containing the address of the second page directory, the address of the second level page directory; and
programming instructions to determine whether all the plurality of memory offsets have been combined with the plurality of page directory entries to obtain a PTE.

* * * * *